A. OLSON.
CLOTHES LINE FASTENER.
APPLICATION FILED JUNE 22, 1908.

900,879.

Patented Oct. 13, 1908.

Witnesses
C. E. Smith.
S. E. Dodge.

Inventor
A. Olson
By Beeler & Robb
Attorneys

UNITED STATES PATENT OFFICE.

ALFRED OLSON, OF ASHTABULA, OHIO.

CLOTHES-LINE FASTENER.

No. 900,879.

Specification of Letters Patent.

Patented Oct. 13, 1908.

Application filed June 22, 1908. Serial No. 439,825.

*To all whom it may concern:*

Be it known that I, ALFRED OLSON, a citizen of the United States, residing at Ashtabula, in the county of Ashtabula and State of Ohio, have invented certain new and useful Improvements in Clothes-Line Fasteners, of which the following is a specification.

This invention relates to devices for fastening the ends of lines, wires, and the like, and has for its particular object the provision of a simple and durable means for fastening the end of a clothes line.

Figure 1:
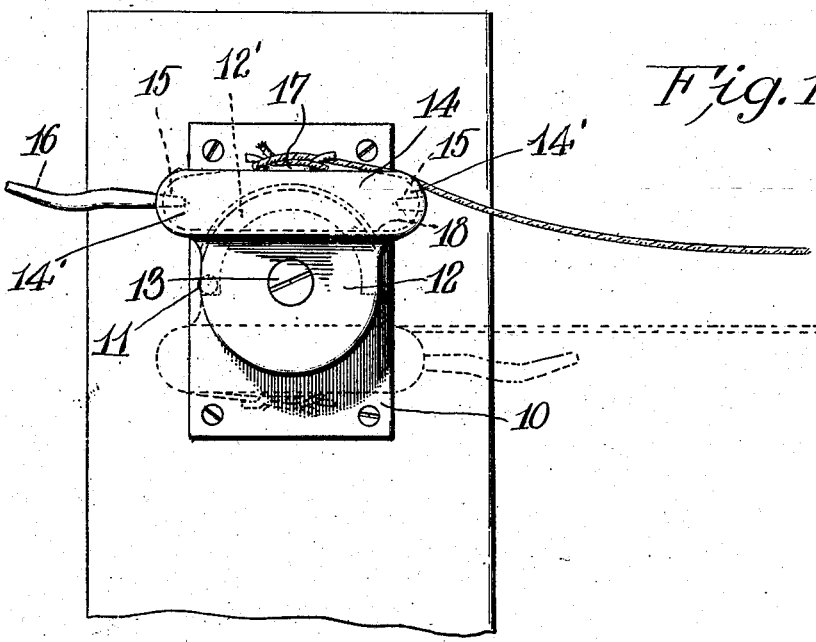
Figures 2, 3:
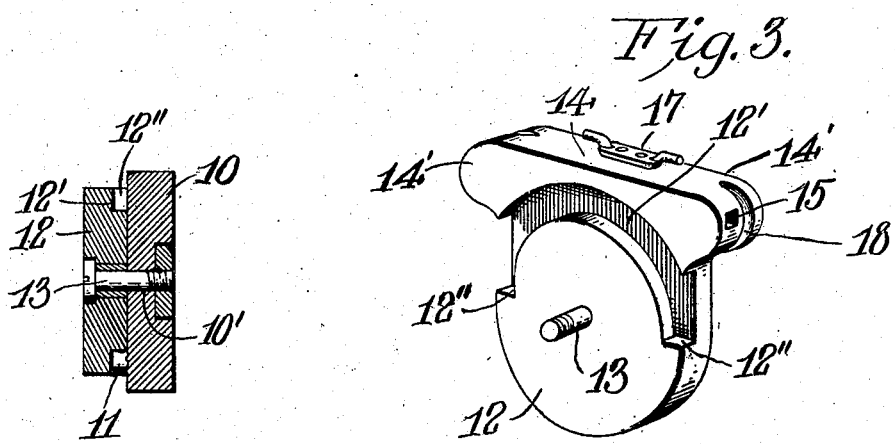

For a full understanding of the invention, including its construction and characteristic advantages, reference is to be had to the following detail description and the accompanying drawings, in which Figure 1 is a vertical face view of the device applied to its support and with a fragment of a clothes line attached preparatory to the operation of the device; Fig. 2 is a transverse section taken on the plane of the axis of the pivot bolt, and Fig. 3 is a detail perspective of the movable element of the device.

Throughout the following detail description and on the several figures of the drawings, similar parts are referred to by like reference characters.

This invention comprises essentially a base plate 10 adapted to be secured firmly as by the use of bolts or screws to any suitable support, such as a post, corner of a building, or the like. The said plate 10 is provided with a central hole 10′, and on substantially the same horizontal line as said hole and near one side of the plate is a fixed stud 11. Mounted upon the face of the base plate and pivoted thereto is a movable member or hub 12. A center pin or bolt 13 of any suitable character passes through the hub 12 and into the hole 10′ of the base plate, the connection being such that the hub is permanently attached to the base plate in such a manner that it may rotate thereupon through a portion of a circle. The inner face of the hub 12 is provided with an arc-shaped groove 12′ concentric with the bolt 13, and in which the stud 11 enters. The stud 11 by this means constitutes a stop to limit the rotation of the hub 12 with respect to the base plate, the stud being adapted to engage one or the other of the shoulders 12″ at the ends of the groove 12′.

Upon one side, preferably on that side of the hub upon which is located the groove 12′ there is provided an extension or boss 14. This extension is preferably longer than the diameter of the hub 12 and terminates in two oppositely extending lobes 14′, in each of which is a socket 15 to receive an operating handle or lever 16. While the boss 14 is shown as being longer than the diameter of the hub it is to be understood that it may be longer or not as preferred. Upon the outer face of the boss 14 is attached any suitable form of temporary securing means such as a cleat 17 whereby a wire or line may be attached temporarily for the purpose of the device. Furthermore the boss is preferably grooved as at 18 at its lobes and around that portion of the same opposite to the cleat 17 for the purpose of receiving the clothes line during the operation. It will thus be seen that the boss is sufficiently thicker than the thickness of the hub 12 to provide for an extension in a direction parallel with the pivot bolt 13 and upon which extension the line will be wound.

The operation of the device is as follows: With the base plate 10 secured in place as above indicated and with the stud 11 upon that side of the plate represented by the direction in which the line is to be drawn and tightened, the hub will occupy the position as indicated in full lines in Fig. 1 with the boss 14 upward. The operator will then temporarily secure the loose end of the line to the cleat 17, snubbing it thereto in an ordinary manner, and after this is done he will insert the lever 16 in the left socket 15 and then bear downwardly upon the lever, turning the hub 12 counter-clock-wise through an angle of 180 degrees. During this operation the line will be guided into the groove 18 in the right lobe 14 and the line will become stretched in so doing. During the turning motion above mentioned the point of attachment of the line upon the boss 14 will pass beyond and below the axis of the pivot 13, whereby the tension upon the line upon the boss 14 will hold the hub 12 in its turned position, as indicated in dotted lines in Fig. 1. After this operation has been effected the lever 16 may be withdrawn if desired. It will be observed that during the operation of attaching the line to the cleat 17 initially the lug 11 will hold the hub in its upright position by coöperation with one of the shoulders 12″, and after the line is fastened the same lug will coöperate with the opposite shoulder 12″ preventing the tension of the line from turning the hub beyond the desired point.

It is noteworthy that the device is symmetrically made so that it may be adapted for application on either side of a post. That is to say, it being understood that the clothes line will be permanently secured at one end, the base plate 10 may be secured to a post or a corner of a building in such a manner as to provide that the line shall be drawn to the operator's left hand, as above set forth, or it may be so attached to the support as to provide that the line shall be drawn and fastened in the direction indicated by the operator's right hand. To accomplish this result it is only necessary to invert the base plate so as to bring the lug on the right side instead of on the left side as above described. The operation will then be substantially the same as that hereinbefore set forth. The pivotal connection between the hub and base plate need not be a stiff one, it being necessary only that the center bolt 13 be tight enough to hold the parts in proper position. Friction is not depended upon to hold the hub 12 in either position in its adjustment, the tension on the line being rather for this purpose.

The device may be constructed of any suitable materials and in sizes to accord with the work to be performed thereby.

Variations in proportions of the parts may be made also within the spirit of the invention.

Having thus set forth the preferred embodiment of my invention what I claim and desire to secure by Letters Patent of the United States, is:

In a clothes line fastener, the combination of a base plate, a hub, means to pivotally connect the hub to the base plate, means to limit the rotation of the hub upon the base plate to a portion of the circle, the hub being provided on one side with a boss comprising two oppositely extending lobes, each lobe having a socket and a line groove, a lever to be applied to either of said sockets, and means to attach the end of a line to the upper face of said boss, substantially as set forth.

In testimony whereof I affix my signature in presence of two witnesses.

ALFRED OLSON.

Witnesses:
 OTTO BENSON.
 ALFRED LARSON.